(12) United States Patent
Carney et al.

(10) Patent No.: US 8,824,472 B2
(45) Date of Patent: Sep. 2, 2014

(54) SANITIZING PACKET HEADERS

(75) Inventors: Mark D. Carney, Sterling, VA (US);
Dante Pacella, Charles Town, WV (US);
Harold J. Schiller, Silver Spring, MD (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 243 days.

(21) Appl. No.: 12/883,243

(22) Filed: Sep. 16, 2010

(65) Prior Publication Data

US 2012/0069845 A1   Mar. 22, 2012

(51) Int. Cl.
*H04L 12/28* (2006.01)
*H04L 12/56* (2006.01)
*H04L 29/06* (2006.01)

(52) U.S. Cl.
CPC ......... *H04L 63/1466* (2013.01); *H04L 63/0227* (2013.01); *H04L 45/60* (2013.01); *H04L 45/22* (2013.01)
USPC .......................................................... 370/392

(58) Field of Classification Search
USPC .......................................... 370/252, 428, 392
See application file for complete search history.

(56) References Cited

U.S. PATENT DOCUMENTS

| | | | |
|---|---|---|---|
| 7,602,731 B2 * | 10/2009 | Jain | 370/252 |
| 7,626,940 B2 * | 12/2009 | Jain | 370/252 |
| 2002/0042875 A1 * | 4/2002 | Shukla | 713/151 |
| 2007/0147376 A1 * | 6/2007 | Perlman et al. | 370/392 |
| 2007/0147382 A1 * | 6/2007 | Kim et al. | 370/392 |
| 2009/0028144 A1 * | 1/2009 | Blair | 370/389 |
| 2009/0183260 A1 * | 7/2009 | Hernacki et al. | 726/23 |
| 2011/0040897 A1 * | 2/2011 | Pope et al. | 709/250 |
| 2011/0173514 A1 * | 7/2011 | Pope et al. | 714/758 |
| 2012/0023330 A1 * | 1/2012 | Fink et al. | 713/161 |

* cited by examiner

*Primary Examiner* — Ayaz Sheikh

(57) ABSTRACT

A network device may receive a packet, determine whether the packet includes two or more headers of a same type, modify the packet to correct for the two or more headers of the same type when the packet includes the two or more headers of the same type, determine whether the packet includes out-of-sequence headers, and modify the packet to correct for the out-of-sequence headers when the packet includes the out-of-sequence headers.

20 Claims, 9 Drawing Sheets

SANITIZING PACKET HEADERS

BACKGROUND INFORMATION

A typical size of an Internet Protocol version 4 (IPv4) packet header is 128 bytes. An IPv4 packet header includes a version field, header length field, differentiated services field, packet length field, packet identification field, flags field, fragment offset field, time-to-live field, protocol field, header checksum field, source field, and destination field. Although an IPv4 packet header can also include an options field, which may increase the size of the packet, the options field is infrequently used and, often, network devices do not support its use.

DETAILED DESCRIPTION OF PREFERRED EMBODIMENTS

The following detailed description refers to the accompanying drawings. The same reference numbers in different drawings may identify the same or similar elements.

The term "packet," as used herein, may refer to an IP packet, datagram, cell, a fragment of an Internet Protocol (IP) packet, or other types of data that may be carried at a specified communication layer. As used herein, the term "router" may refer to a network layer 2 or layer 3 (e.g., an IP layer) router or switch (e.g., Multiprotocol Label Switching (MPLS) router). In some contexts, the term "router" may also refer to layer 4-7 application/devices.

As described below, a device may sanitize a bad packet. A bad packet may include, for example, duplicate headers or two or more headers of the same type, out-of-sequence headers, and/or an invalid fragment header. By sanitizing the bad packet, the device may prevent the packet from, for example, accessing an otherwise secure network, destroying and/or damaging files, stealing information, creating security holes, spreading computer viruses and/or malware, etc.

Figure 1:
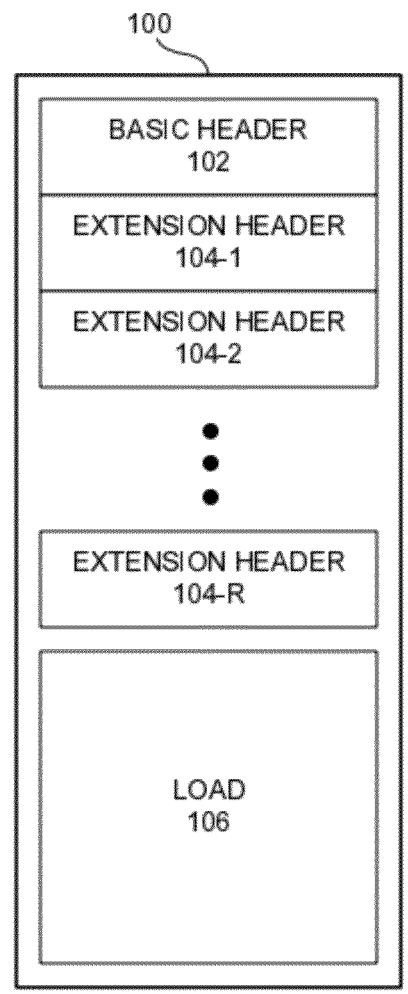
FIG. 1 illustrates an exemplary format of a packet.

FIG. 1 illustrates an exemplary format of a packet. Although, in an actual implementation, packet 100 may include an IPv4 packet with options field or additional headers (e.g., multiprotocol label switch (MPLS) headers), in the following description, packet 100 will be described as an IPv6 packet. Because an IPv6 packet can facilitate transport of optional headers and/or fields, a bad IPv6 packet can be readily created, either accidentally or purposefully by a malicious network attacker.

As shown, packet 100 may include a basic header, extension headers 104-1 through 104-R (individually "extension header 104 or 104-x," or collectively, "extension headers 104"), and a load 106. Depending on the implementation, packet 100 may include different headers and/or fields. For example, when packet 100 is implemented as a MPLS packet, packet 100 may include a MPLS label stack between extension header 104-R and load 106.

Basic header 102 may include a version field, traffic class field, flow label field, payload length field, next header field, hop limit field, source address field, and destination address field. The version field may identify the version of IP protocol. This field may be set to 6 for IPv6. The traffic class field may allow a source node or router to distinguish between different priorities of packets. The flow label field may identify a flow (e.g., a group of packets that have the same source and destination addresses) to which packet 100 belongs. The payload length field specifies the length of the payload of packet 100. The payload of packet 100 may include extension headers 104 and load 106. The next header field may identify extension header 104-1 (i.e., the header that immediately follows header 102). The hop limit field indicates the maximum number of hops that packet 100 can be forwarded. The source address field and the destination address field may identify the source and destination addresses for packet 100.

Extension header 104 may define one or more parameters that describe packet 100. Extension header 104 may include, for example, a hop-by-hop header, routing header, fragment header, authentication header, destination options header, etc. For packet 100 to be compliant with IPv6 standards and/or specifications (e.g., Internet Engineering Task Force (IETF) Request for comments (RFC) 2460), extension headers 104 must be in a specific order. For example, the hop-by-hop header must precede the fragment header.

The hop-by-hop header may include optional information that must be examined by every network device/node along packet 100's path. The routing header may list network devices/nodes that are to be visited by packet 100 on its path toward its destination. The fragment header may describe a relative location, within an original packet from which a fragment is derived, of the fragment that packet 100 carries. The source node may have fragmented the original packet into several fragment packets, for example, due to the size of the original packet. The fragment packets may be reassembled into the original packet at the destination of packet 100.

The authentication header may specify a method by which authentication may be performed. In addition, the authentication header may include information that may be used for the authentication. Destination options header may include information that needs to be examined by the destination node. Although extension header 104 may include other types of headers, they are not described for simplicity.

Load 106 may include data that packet 100 carries. Load 106 may or may not include additional headers or header-related information.

In FIG. 1, packet 100 may be "bad" when extension headers 104 include one or more duplicate copies of an extension header or two or more of one type of header (e.g., hop-by-hop header, routing header, etc.) with conflicting information. Packet 100 may also be bad when extension headers 104 are out-of-sequence. In a valid IPv6 packet, extension packet headers 104 must be in a specific sequence (e.g., a hop-by-hop header, if present in packet 100, must precede other extension headers 104). Further, packet 100 may be bad when packet 100 includes an invalid fragment header. For example, the fragment header of packet 100 may incorrectly specify that data in payload 106 of packet 100 is a fragment of data whose portions are carried by three other packets.

Figure 2:
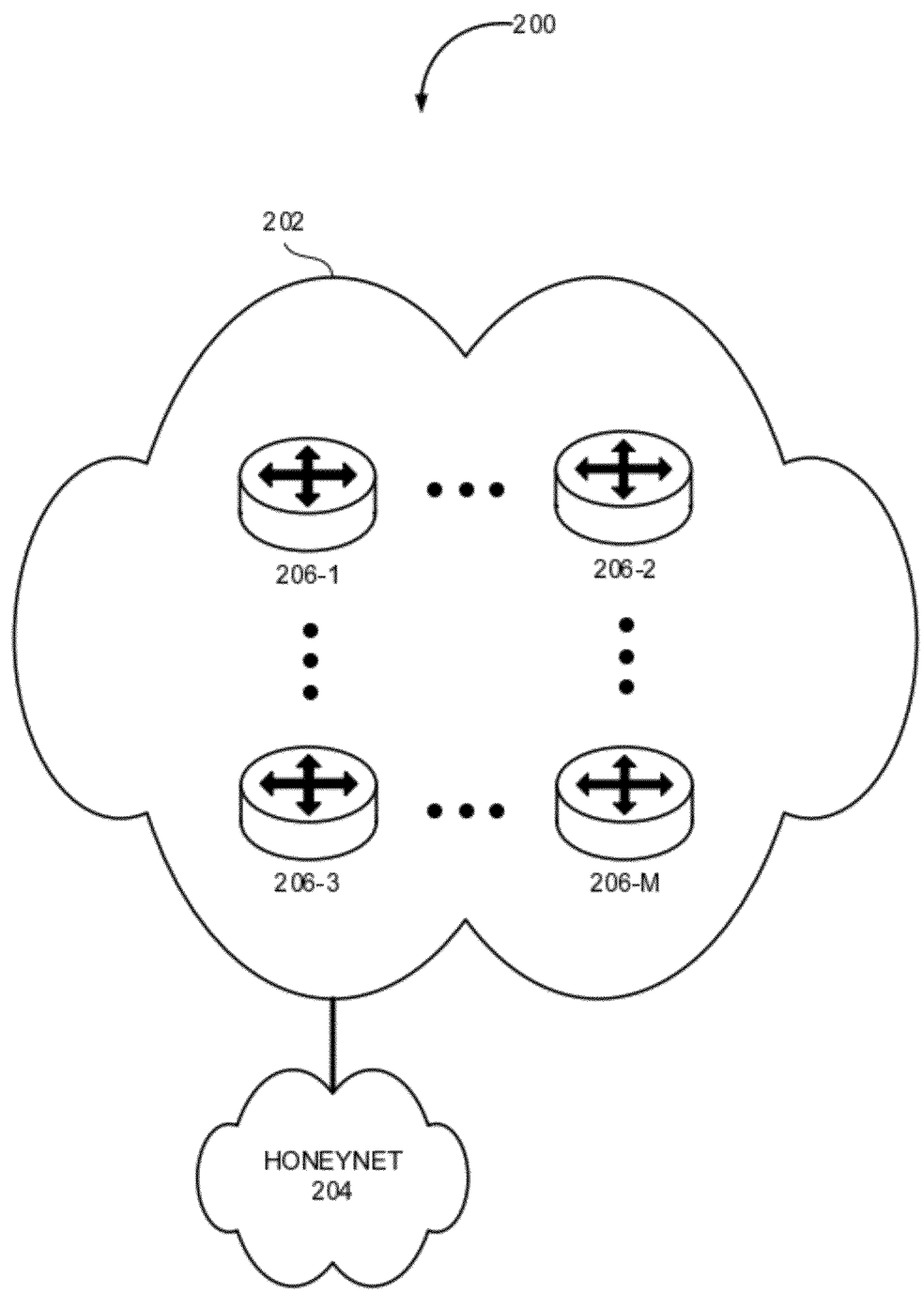
FIG. 2 illustrates an exemplary network in which the concepts described herein may be implemented.

FIG. 2 illustrates an exemplary network 200 in which concepts described herein may be implemented. As shown, network may include network 202 and honeynet 204 (or honey net 204). Depending on the implementation, network 200 may include additional, fewer, different, or a different arrangement of networks and devices than those illustrated in FIG. 2.

Network 202 may include the Internet, an intranet, a local area network (LAN), a wide area network (WAN), a metropolitan area network (MAN), a cellular network, a public switched telephone network (PSTN), an optical network, a wireless network (e.g., Wi-Fi, WiMax, etc.), a wired network, a packet switched network (e.g., IPv6 and/or IPv4), an ad hoc network, any other network, or a combination of one or more networks.

Honey net 204 may include one or more network devices or resources (e.g., files, records, etc.) for trapping or recording packet activities. By monitoring such packets, honey net 204 may determine the purpose and/or effect that the packets may have in a network.

As further shown, network 202 may include network devices 206-1 through 206-M (network devices 206). Network device 206 may include, for example, a router, switch, gateway, server, personal computer, mobile computer (e.g., mobile router, laptop computer, tablet computer, cellular phone, etc.), etc. Although network device 206 may be implemented as any computer-like network device with an Internet Protocol (IP) stack, in the following description, network device 206 is described in terms of a router (e.g., router 206 or routers 206).

Router 206 may perform routing, forwarding, and packet header sanitization. In performing the routing function, router 206 may exchange messages with other network devices through routing protocols to discover information about reachability of destinations, the network topology, and costs associated with routes. This information is stored in the Routing Information Base (RIB). Best paths for the destinations and their associated egress interfaces (e.g., line cards) are determined and stored in the forwarding information base (FIB).

In performing the forwarding function and the packet header sanitization function, router 206 may receive packets from one or more physical communication interfaces/ports, classify the packets, and determine required processing (e.g., deep packet inspection and/or packet header sanitization) based on the packet headers.

To forward the packets, router 206 may determine their destinations, and transmit the packets on one or more physical or logical communication interfaces/ports in accordance with the determined destinations or other properties of the packets based on information provided by the FIB. To sanitize the packets, router 206 may examine the packet header for duplicate headers or multiple instances of a particular header type, out-of-sequence headers, fragment header, etc.

Figure 3:
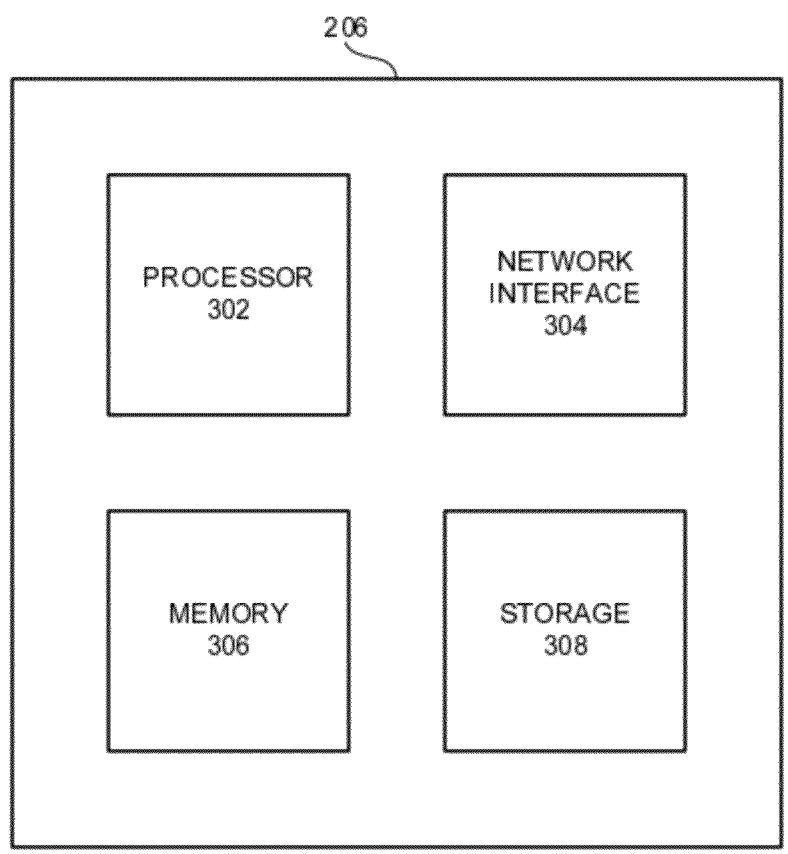
FIG. 3 shows exemplary components of a router of FIG. 2.

FIG. 3 is a block diagram illustrating exemplary components of router 206. As shown, router 206 may include a processor 302, network interface 304, memory 306, and storage 308. These components may be distributed over different line cards (e.g., ingress line cards for receiving packets, egress line cards for sending packets, etc.), service modules for processing packet headers (e.g., sanitizing packets, etc.), a control module (e.g., a central module for controlling the line cards and/or service modules, for performing the routing function, etc.), etc. Depending on the implementation, router 206 may include additional, fewer, or different components than those illustrated in FIG. 3.

Processor 302 may include one or more processors, microprocessors, Application Specific Integrated Circuits (ASICs), and/or Field Programmable Gate Arrays (FPGAs), and/or other processing logic. In some implementations, processor 302 may include processors that are dedicated to specific functions, such as packet processing, packet forwarding, memory management, etc.

Network interface 304 may include one or more physical or logical communication ports that enable router 206 to communicate with other devices. Via the physical ports, network interface 304 may communicate via a network, such as the Internet, a terrestrial wireless network (e.g., a WLAN), a satellite-based network, etc.

Memory 306 may include a static memory, such as read only memory (ROM), and/or dynamic memory, such as random access memory (e.g., DRAM, SDRAM, SRAM, etc.), content addressable memory (CAM), or onboard cache, for storing data and machine-readable instructions. For example, a component of memory 306 may provide, for example, space for queuing packets, packet headers, etc., before the packets are sent toward one or more egress line cards/service modules via a switch fabric.

Storage 308 may include a hard disk drive, solid state drive, flash drive, floppy disk, CD ROM, CD read/write (R/W) disc, digital video disc (DVD) reader/writer, as well as other types of storage devices for storing data and/or machine-readable instructions (e.g., a program, script, etc.). Depending on the context, the term "memory," "storage," "storage device," and/or "storage unit" may be used interchangeably. For example, a "computer-readable storage device" may refer to both a memory and/or storage device.

Figure 4:
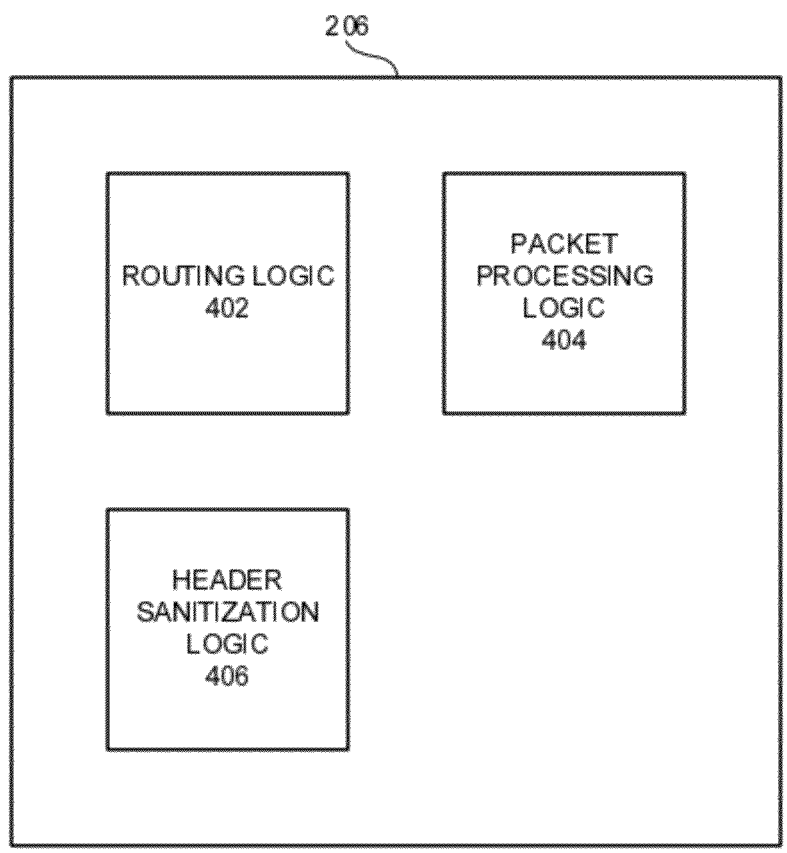
FIG. 4 is a block diagram illustrating exemplary functional components of the router of FIG. 2.

FIG. 4 is a block diagram illustrating exemplary functional components of router 206. As shown, router 206 may include routing logic 402, packet processing logic 404, and header sanitization logic 406. Depending on the implementation, router 206 may include additional, fewer, or different components than those illustrated in FIG. 4. For example, router 206 may include a component for storing/measuring flow statistics. Although router 206 may include other components, such as a RIB or FIB, they are not illustrated for simplicity.

Routing logic 402 may gather or disseminate routing information from/to other routers 206 in accordance with routing/signaling protocols (e.g., open shortest path first (OSPF), interior gateway routing protocol (IGRP), multiprotocol label switching (MPLS) protocol, etc.), organize the routing information in a lookup table, such as a RIB, a label information base (LIB), etc. In another example, routing logic 402 may create a lookup table (e.g., a FIB, a forwarding label information base (FLIB), etc.) and distribute the lookup table to line cards, on which packet processing logic 404 may be implemented.

Packet processing logic 404 may place packets that are received at a line card/service module in queues where they are temporarily held, and forward them to an egress line card or another service module based on information in a FIB or based on packet headers. Packet processing logic 404 may also perform other processing, such as classifying packets, collecting flow statistics, logging, etc.

Header sanitization logic 406 may sanitize packet headers. In one implementation, header sanitization logic 406 may fix, drop, and/or re-route packets with duplicate headers or multiple headers of a same type, out-of-sequence headers, and/or invalid fragment headers. Depending on the implementation, header sanitization logic 406 may also sanitize other types of errors, such as an invalid extension header other than fragment header (e.g., invalid hop-by-hop header, authentication header, etc.), bad labels, bad routing headers (e.g., not all addresses in the routing header are valid), etc.

In some implementations, header sanitization logic 406 may be implemented on a single service module or distributed over several components. In the latter implementations, headers of a packet may "bounce" from one service module to another via a switch fabric until all of the headers are processed and sanitized. Thereafter, header sanitization logic 406 may drop the packet or send the packet to a deep inspection module, honey net 204, etc.

Figure 5:
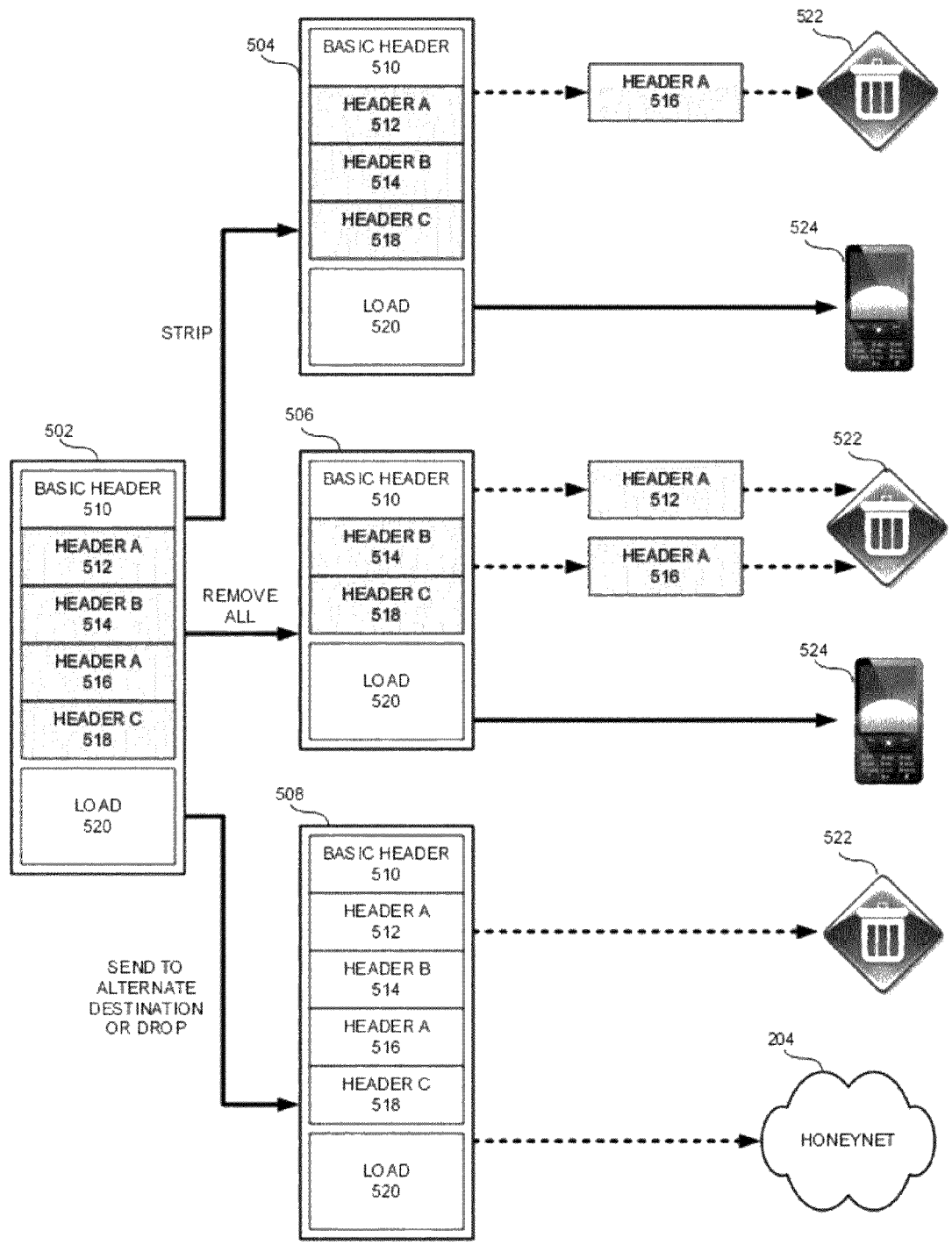
FIG. 5 illustrates an overview of an exemplary process associated with sanitizing packet headers.

FIG. 5 illustrates an overview of an exemplary process associated with sanitizing packet headers. In this example, header sanitization logic 406 may process packet 502 to produce packet 504, packet 506, or packet 508. Although not illustrated, depending on the implementation, header sanitization logic 406 may perform other types of packet sanitization (e.g., detecting other types of invalid extension headers).

As further shown, packet 502 may include a basic header 510, extension header A 512, extension header B 514, extension header A 516, extension header C 518, and load 520. Extension header A 516 may either be a duplicate of extension header A 512 or the same type of header as extension header A 512. Extension header A 512/516 may include, for example, a hop-by-hop header, routing header, authentication header, etc. It is assumed that extension headers A 512 and 516 are not destination options headers in the following order: once before a routing header of IPv6 and an upper-layer header of IPv6.

In FIG. 5, header sanitization logic 406 may process packet 502 in one of three ways. For example, header sanitization logic 406 may strip duplicate extension header A 516 from packet 502 to produce packet 504. In FIG. 5, this is illustrated by extension header A 516 being shown via the dotted arrow originating from packet 504 and pointing to a garbage can icon 522. In addition, header sanitization logic 406 may send packet 504 to its destination device 524 (e.g., via an egress line card), as illustrated by a solid arrow pointing from packet 504 to destination device 524.

In another example, sanitization logic 406 may remove both extension header A 512 and extension header A 516 from packet 502 to obtain packet 506. In FIG. 5, this is illustrated by headers A 512 and headers A 516 being shown via the dotted arrows that originate from packet 506 and point to garbage can icon 522. In addition, header sanitization logic 406 may send packet 506 to destination device 524 via an egress line card, as illustrated by the solid arrow from packet 506 to destination device 524.

In yet another example, sanitization logic 406 may retain original packet 502, which is also shown as packet 508 in FIG. 5. Subsequently, header sanitization logic 406 may drop packet 508, as illustrated by the dotted arrow from packet 508 to garbage can icon 522, or alternatively, send packet 508 to honey net 204, as illustrated by the dotted arrow from packet 508 to honey net 204. In honey net 204, a honey pot and/or other devices may analyze packet 508, observe packet 508's behavior, and/or obtain other properties of packet 508.

Figure 6:
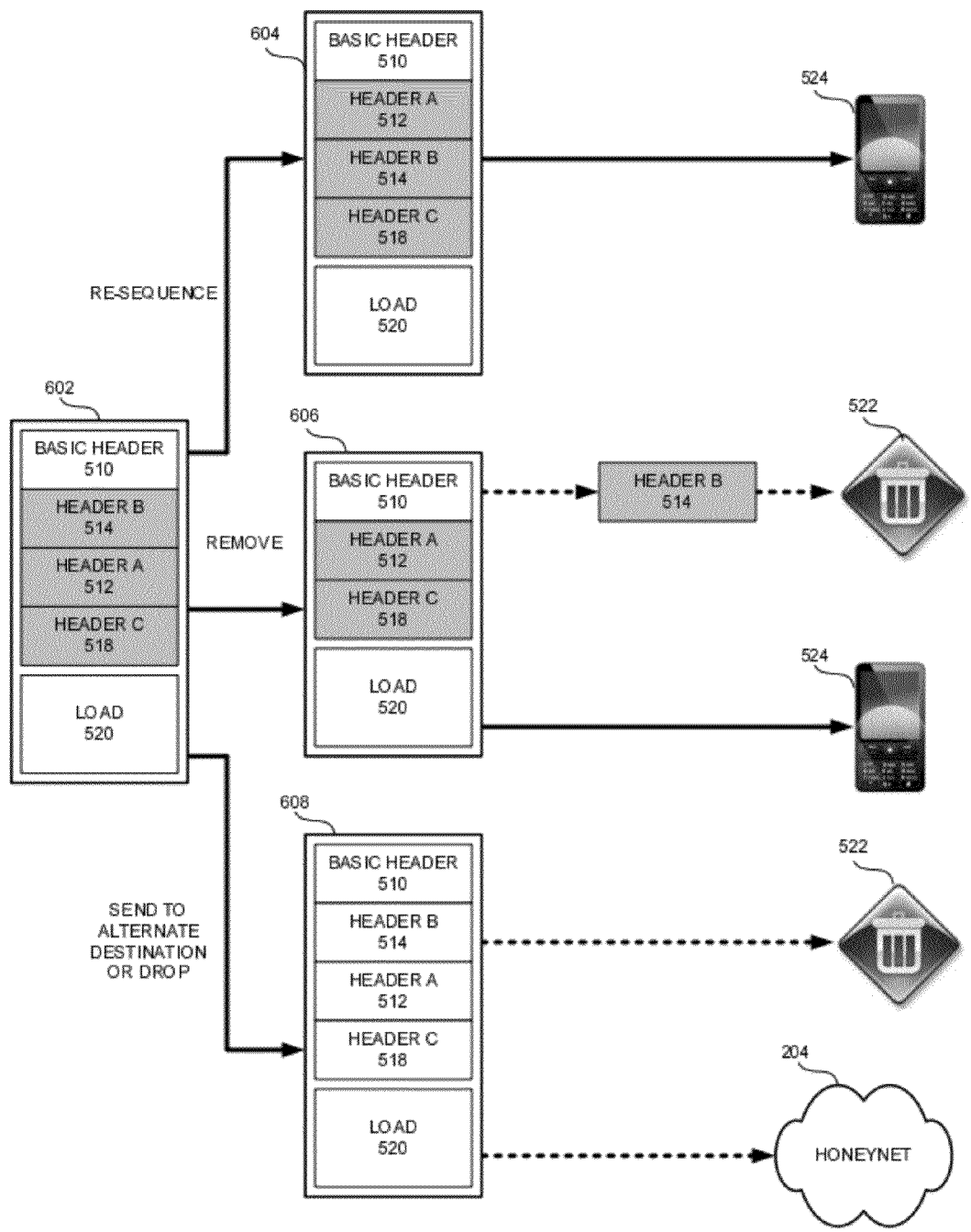
FIG. 6 further illustrates an overview of another process associated with sanitizing packet headers.

FIG. 6 illustrates an overview of another exemplary process associated with sanitizing packet headers. In this example, header sanitization logic 406 may process packet 602 to produce packet 604, packet 606, or packet 608. Although not illustrated, depending on the implementation, header sanitization logic 406 may perform other types of packet sanitization.

As further shown, packet 602 may include a basic header 510, extension header B 514, extension header A 512, extension header C 518, and payload 520. In this example, extension header B 514, extension header A 514, and extension header C 518 are out-of-sequence.

In FIG. 6, header sanitization logic 406 may process packet 602 in one of three ways. For example, header sanitization logic 406 may re-sequence extension header B 514, extension header A 512, and extension header C 518 in packet 602 to obtain packet 604. In packet 604, the extension headers are in the following sequence: extension header A 512, extension header B 514, and extension header C 518. In addition, header sanitization logic 406 may send packet 604 to destination device 524, as illustrated by the solid arrow originating from packet 604 to destination device 524.

In another example, header sanitization logic 406 may remove extension header B 514 from packet 602 to obtain packet 606, which includes extension header A 512 and extension header C 518. The header removal is illustrated by header B 514 via the dotted arrow that originates from packet 606 and points to garbage can icon 522. In a different implementation or configuration, header sanitization logic 406 may remove header A 512 from packet 602 instead of header B 514 to sanitize packet 602. After the removal of extension header B 514 (or extension header A 512), header sanitization logic 406 may send packet 606 to destination device 524, as illustrated by the solid arrow from packet 606 to destination device 524.

In yet another example, sanitization logic 406 may retain original packet 602, which is also shown as packet 608 in FIG. 6. Subsequently, header sanitization logic 406 may drop packet 608, as illustrated via the dotted arrow from packet 608 to garbage can icon 522, or alternatively, send packet 608 to honey net 204, as illustrated by the dotted arrow from packet 608 to honey net 204.

Figure 7:
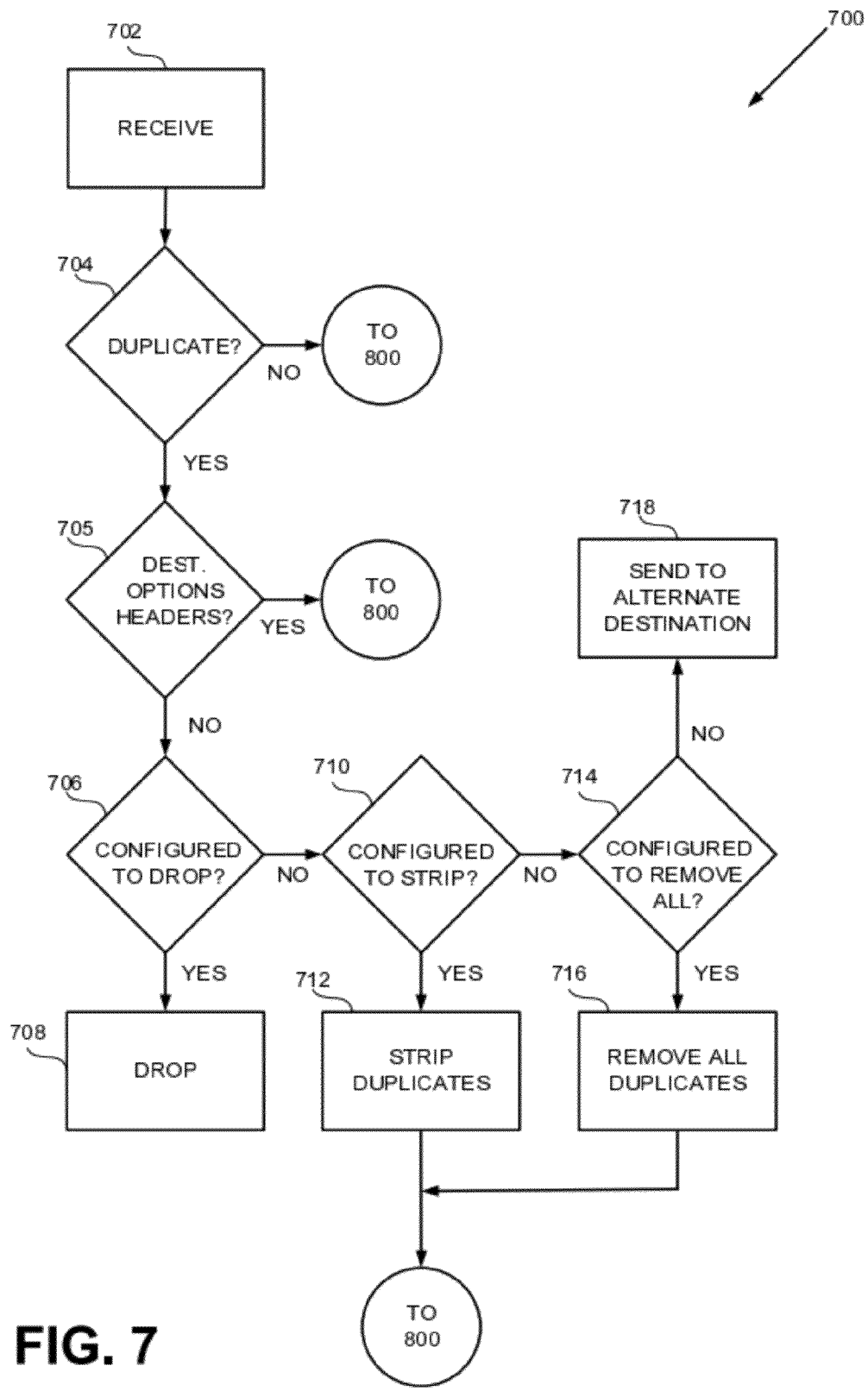
FIG. 7 is a flow diagram of an exemplary process associated with sanitizing a packet with multiple copies of a header.
Figure 8:
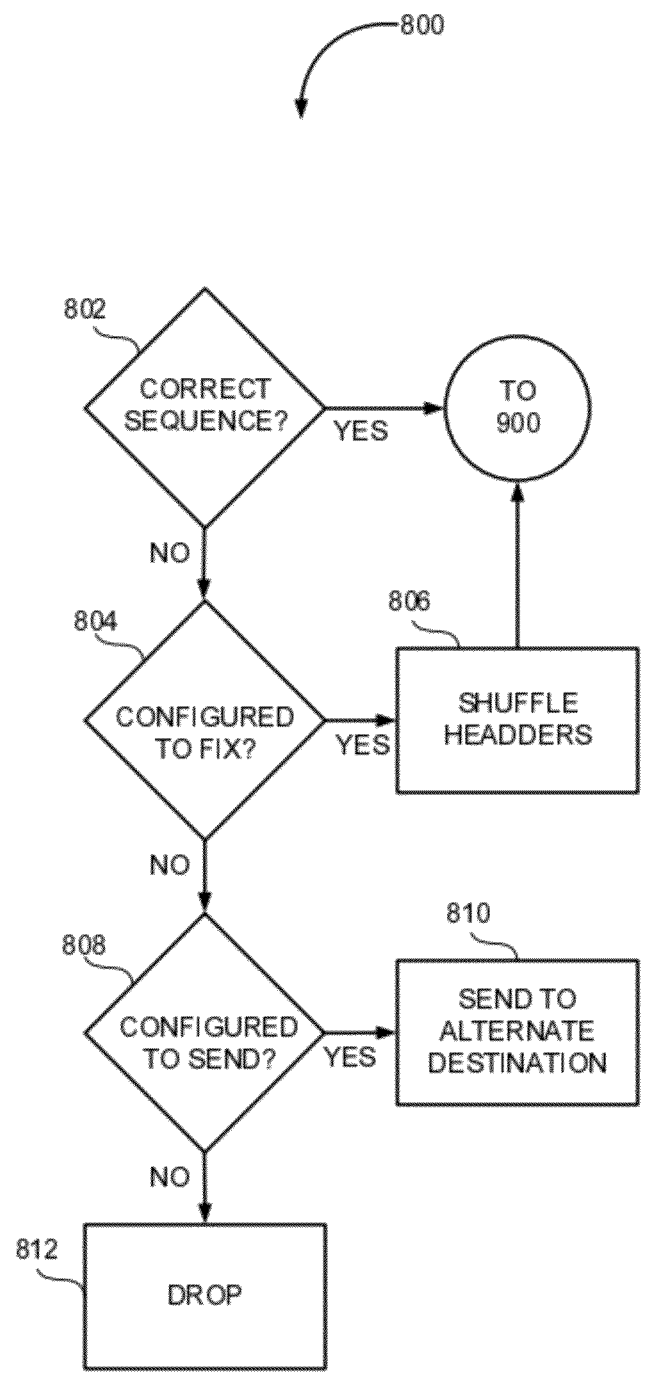
FIG. 8 is a flow diagram of an exemplary process associated with sanitizing a packet with out-of-sequence headers.
Figure 9:
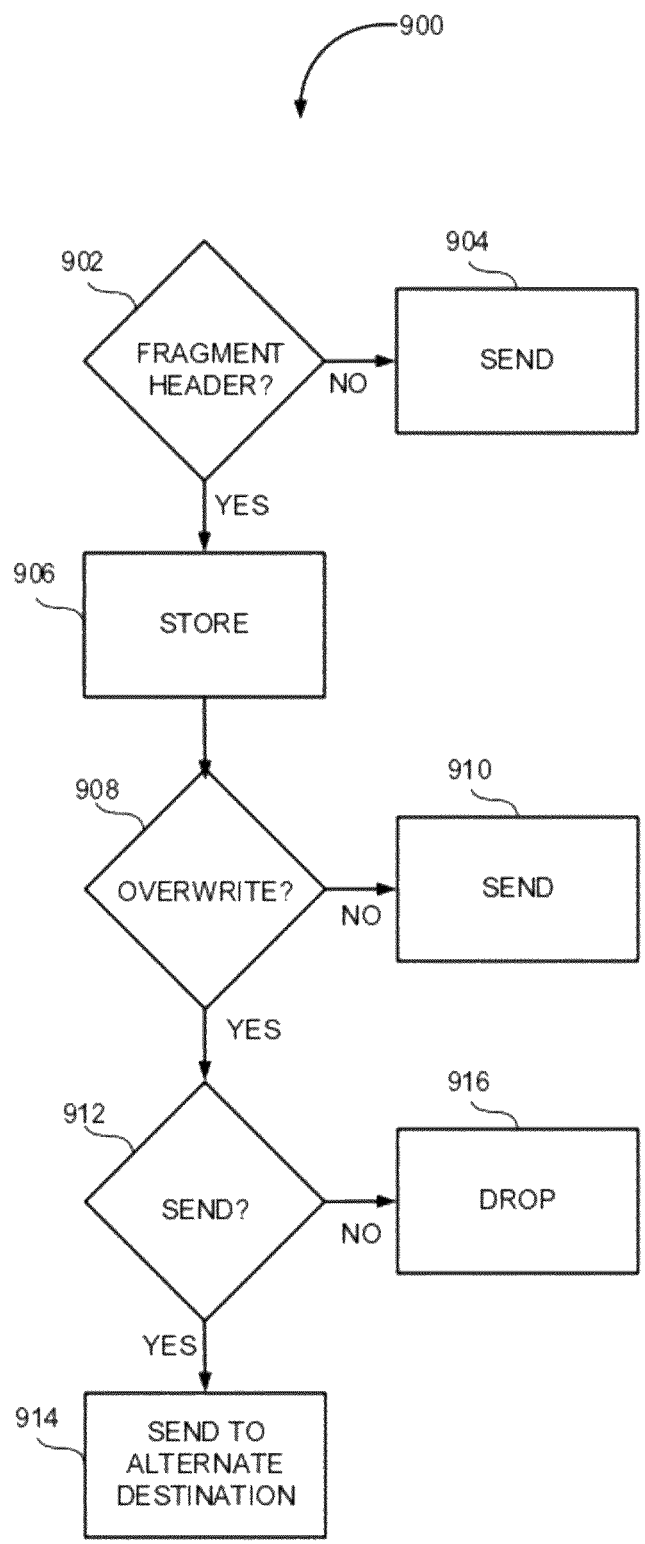
FIG. 9 is a flow diagram of an exemplary process associated with sanitizing a packet with an invalid fragment header.

FIGS. 7 through 9 are flow diagrams of exemplary processes whose overview are illustrated by FIG. 5 and FIG. 6. FIG. 7 is a flow diagram of an exemplary process 700 associated with sanitizing a packet with multiple copies of a header or multiple headers of the same type. As shown in FIG. 7, process 700 may begin when router 206 receives a packet (e.g., IPv6 packet). Router 206 may internally pass the packet headers of the received packet to header sanitization logic 406.

Header sanitization logic 406 may determine whether the packet includes duplicate headers and/or multiple headers of the same type (block 704). If the packet does not include duplicate headers or multiple headers of the same type (block 704—NO), process 700 may proceed to process 800, for sanitizing out-of-sequence packet headers. Otherwise (block 704—YES), process 700 may proceed to block 705.

If the duplicate headers or the multiple headers of one type are two destination options headers of IPv6 in a specific order (e.g., one of the two destination options appears before a routing header and the other of the two destination options headers appears before an upper-layer header) (block 705—YES), process 700 may go to process 800. Otherwise (block 705—NO), process 700 proceed to block 706.

If header sanitization logic 406 is configured to drop the packet with duplicate headers or multiple headers of the same type (block 706—YES), header sanitization logic 406 may drop the packet (block 708). Otherwise (block 706—NO), process 700 may proceed to block 710.

If header sanitization logic 406 is configured to strip off all but one of the duplicate headers or all but one of the same type of headers (block 710—YES), header sanitization logic 406 may strip off all but one of the duplicate headers or all but one of the same type of headers (block 712). In stripping off the headers, header sanitization logic 406 may retain, in the packet, the extension header whose position is valid. For example, in FIG. 5, header sanitization logic 406 removes header A 516 to obtain packet 504 and does not remove header A 512. Furthermore, header sanitization logic 406 may rewrite or correct next header fields within the remaining extensions headers, such that the extension headers remain valid. Thereafter, process 700 may proceed to process 800, for sanitizing out-of-sequence packet headers.

If header sanitization logic 406 is not configured to strip off all but one of the duplicate header or all but one of the same type of headers (block 710—NO), process 700 may proceed to block 714. At block 714, if header sanitization logic 406 is configured to strip off all of the duplicate headers or all of the same type of headers (block 714—YES), header sanitization logic 406 may remove all duplicate headers or all of the same type of headers (block 716). As at block 712, header sanitization logic 406 may rewrite the next header fields of the remaining extension headers in the packet. Thereafter, process 700 may proceed to process 800.

If header sanitization logic 406 is not configured to strip off all of the duplicate headers or all of the same type of headers (block 714—NO), header sanitization logic 406 may send the received packet to an alternate destination (block 718) (e.g., honey net 204).

FIG. 8 is a flow diagram of an exemplary process 800 associated with sanitizing a packet with out-of-sequence headers. As shown in FIG. 8, process 800 may start with header sanitization logic 406 determining whether the packet includes headers in a sequence that is compliant with a particular standard or specification (e.g., RFC 2460) (block 802). If the packet headers are in an order that is compliant with the standard/specification (block 802—YES), process 800 may proceed to process 900, for sanitizing packets with an invalid fragment header. If the packet headers are not in an order compliant with the standard/specification, process 800 may proceed to block 804.

If header sanitization logic 406 is configured to fix the out-of-sequence headers (block 804—YES), header sanitization logic 406 may shuffle or move the headers of the packet and arrange the headers in a correct order (block 806). In addition, header sanitization logic 406 may rewrite the next header field in each of the extension headers to reflect the header reorganization. Thereafter, header sanitization logic 406 may apply process 900, for sanitizing packets with invalid fragment headers, to the packet.

If header sanitization logic 406 is not configured to fix the headers (block 804—NO), process 800 may proceed to block 808. At block 808, if header sanitization logic 406 is configured to send the packet (block 808—YES), header sanitization logic 406 may send the packet to an alternate destination (block 810) (e.g., honey net 204). Otherwise (block 808—NO), header sanitization logic 406 may drop the packet (block 812).

FIG. 9 is a flow diagram of an exemplary process 900 associated with sanitizing a packet with an invalid fragment header. Process 900 may begin with header sanitization logic 406 determining whether the packet includes a fragment header (block 902). If the packet does not include a fragment header (block 902—NO), header sanitization logic 406 may send the packet to its destination (block 904). If the packet includes a fragment header (block 902—YES), header sanitization logic 406 may store the packet and/or the packet header (block 906) in memory 306. Header sanitization logic 406 may use the stored packet and/or the header when header sanitization logic 406 examines another packet that carries a fragment from the same original packet as the stored packet.

Header sanitization logic 406 may determine whether the fragment header of the packet includes an offset value that, when the value is used to aggregate the fragment from the received packet with other fragments (e.g., from other stored packets), does not result in overwriting the other fragments with the fragment from the received packet.

For example, assume that a first packet and a second packet carry, respectively, a first fragment and a second fragment of an original packet. Assume that each fragment is 1024 bytes long, and the offset value in the fragment header of the second packet specifies 8 bytes. When the first and second fragments are reassembled at the destination node of the first and second packets, the second fragment from the second packet may overwrite the fragment from the first packet, in accordance with the offset value. If the first fragment in the first packet includes extension headers, these headers may be overwritten during the reassembly of the fragments. Determining whether such overwriting can occur may be equivalent to determining whether the offset values of successive packets that carry the fragments of the original packet are progressive (i.e., increasing in order).

If header sanitization logic 406 determines that an overwriting will not occur (block 908—NO), header sanitization logic 406 may forward the packet to the original destination of the received packet (block 910). Otherwise (block 908—NO), process 900 may proceed to block 912.

If header sanitization logic 406 is configured to send the received packet to an alternate destination (block 912—YES), header sanitization logic 406 may send the packet to the alternate destination (block 914) (e.g., honey net 204). Otherwise (block 912—NO), header sanitization logic 406 may drop the packet (block 916).

In processes 700, 800, and 900, network device 206 may sanitize a bad packet. A bad packet may include two or more duplicate headers or headers of the same type, out-of-sequence headers, and/or an invalid fragment header. By sanitizing the bad packet, network device 206 may prevent the packet from, for example, accessing a secure network, destroying and/or damaging files, stealing information, creating security holes, spreading computer viruses and/or malware, etc.

In this specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, after having checked a packet's header or having sanitized the packet's headers, network device 206 may perform additional operations. For example, network device 206 may add another header, such as a destination options header to include notes on actions that were performed on the packet (e.g., verification of extension headers, modification of extension headers, re-routing of the packet, etc.) before forwarding the packet to honey net 204, to its original destination, and/or to another destination. Alternatively, network device 206 may send an Internet Control Message Protocol (ICMP) message or an email message to the original destination of the packet or to another destination, to notify the destination of the operations that were performed. In some implementations, network device 206 may update a file and/or database, which may be on network device 206 or another device, to reflect the operations that were performed on the packet and/or modifications that were made to the packet.

In the above, while series of blocks have been described with regard to the processes illustrated in FIGS. 7 through 9, the order of the blocks may be modified in other implementations. In addition, non-dependent blocks may represent blocks that can be performed in parallel. Furthermore, some of the blocks may be omitted in different implementations.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

No element, block, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   receiving, at a network device, a packet that includes a basic header and at least one extension header;
   determining whether the at least one extension header in the received packet includes two or more extension headers of a same type;
   modifying the received packet to correct for the received packet having the two or more extension headers of the same type when the at least one extension header in the received packet is determined to include the two or more extension headers of the same type;
   determining whether the at least one extension header in the received packet includes out-of-sequence extension headers, wherein the out-of-sequence extension headers include headers that are not in a predetermined sequence;
   modifying the received packet to correct for the out-of-sequence extension headers when the at least one extension header in the received packet is determined to include the out-of-sequence extension headers; and
   sending the received packet in response to determining at least that the at least one extension header does not include the out-of-sequence extension headers and does not include the two or more extension headers of the same type.

2. The method of claim 1, wherein modifying the received packet to correct for the received packet having the two or more extension headers of the same type includes one of:
   removing, from the received packet, all but one of the two or more extension headers of the same type; or
   removing all of the two or more extension headers of the same type from the received packet.

3. The method of claim 1, further comprising:
   determining whether the received packet includes duplicate extension headers; and one of:
   removing, from the received packet, all but one of the duplicate extension headers; or
   removing all of the duplicate extension headers from the received packet.

4. The method of claim 1, wherein determining whether the at least one extension header in the received packet includes out-of-sequence extension headers includes determining whether an order in which extension headers of the received packet are placed in the received packet complies with an order specified by standards or a convention related to a communication protocol.

5. The method of claim 1, wherein modifying the received packet to correct for the out-of-sequence extension headers includes:
   reordering, in the received packet, the out-of-sequence extension headers; or
   removing, from the received packet, one or more of extension headers in the out-of-sequence extension headers.

6. The method of claim 5, further comprising:
   rewriting a next header field in the at least one extension header of the received packet, wherein the next header field identifies one of the at least one extension header.

7. The method of claim 1, further comprising:
   sending the modified packet to an original destination of the modified packet; or
   sending the modified packet to an alternate destination.

8. The method of claim 1, further comprising:
   dropping the received or modified packet, at the network device, when the network device is not configured to send the received or modified packet to another device.

9. The method of claim 1, further comprising:
   determining whether the received or modified packet includes an invalid fragment extension header; and
   sending the received or modified packet to another device if the received or modified packet does not include an invalid fragment extension header,
   wherein a fragment extension header is an extension header that describes a relative location of a fragment within an original packet from which the fragment carried by the received packet is derived.

10. The method of claim 9, further comprising:
    dropping the received or modified packet if the received or modified packet includes the invalid fragment extension header.

11. The method of claim 9, wherein determining whether the received or modified packet includes an invalid fragment extension header includes:
    determining whether the received or modified packet includes a second fragment that would overwrite a first fragment in another packet if the first fragment and the second fragment are assembled in accordance with an offset value in the invalid fragment extension header.

12. The method of claim 9, wherein determining whether the received or modified packet includes an invalid fragment extension header includes:
    determining whether the received or modified packet includes a fragment extension header; and
    when the received or modified packet includes the fragment extension header, storing the received or modified packet or a portion of the received or modified packet, to determine, at a later time, whether a first fragment in another packet will overwrite a second fragment in the received or modified packet if the first fragment and the second fragment are assembled in accordance with an offset value in a fragment extension header of the other packet.

13. The method of claim 1, further comprising:
    determining whether the received or modified packet includes an invalid extension header.

14. A device comprising:
    a line interface to receive a packet and send the packet, wherein the packet includes a basic header and at least one extension header;
    one or more processors configured to:
    receive the packet via the line interface;

determine whether the at least one extension header in the packet includes two or more extension headers of a same type;

modify the packet when the at least one extension header in the packet includes the two or more extension headers of the same type;

determine whether the at least one extension header in the packet includes out-of-sequence extension headers;

modify the packet when the at least one extension header in the packet includes the out-of-sequence extension headers;

determine whether the at least one extension header in the packet includes an invalid fragment extension header; and forward the packet to another device when the device is configured to forward the packet, and the at least one extension header in the packet includes the invalid fragment extension header, wherein the out-of-sequence headers include headers that are not in a predetermined sequence.

15. The device of claim 14, wherein the device comprises a device that includes an Internet Protocol (IP) stack.

16. The device of claim 14, wherein the packet includes: an Internet Protocol (IP) packet.

17. The device of claim 14, wherein the other device includes a honey pot for monitoring the packet, wherein the honey pot comprises a device in a honey net.

18. The device of claim 14, wherein the two or more extension headers of the same type include at least one of:
a hop-by-hop extension header, routing extension header, or authentication extension header.

19. The device of claim 14, wherein the one of more processors are further configured to:

rewrite next header fields of the at least one extension header of the packet when the processor modifies the packet for the out-of-sequence extension headers, wherein each of the next header fields identifies one of the extension headers, wherein each of the next header fields is included in one of the at least one extension header.

20. A computer-readable non-transitory storage device, including one or more computer-executable instructions, the computer-executable instructions causing one or more processors executing the instructions to:

receive, at a device, a packet;

determine whether the packet includes duplicate extension headers;

remove all but one of the duplicate extension headers from the packet when the packet includes the duplicate extension headers;

determine whether the packet includes out-of-sequence extension headers;

reorder, in the packet, the out-of-sequence extension headers when the packet includes the out-of-sequence extension headers;

determine whether the packet includes an invalid fragment extension header; and send the packet from the device toward a destination of the packet when the packet does not include the invalid fragment extension header.

* * * * *